United States Patent Office 2,694,071
Patented Nov. 9, 1954

2,694,071

PROCESS FOR THE PREPARATION OF TECHNICALLY VALUABLE OXAZOLINES

Robert Michel Jacob, Ablon sur-Seine, and Jacques Georges Robert, Paris, France, assignors, by mesne assignments, to Parke, Davis & Company, Detroit, Mich., a corporation of Michigan No Drawing. Application February 23, 1951, Serial No. 212,490

Claims priority, application France July 21, 1950

9 Claims. (Cl. 260—307)

This invention relates to a process for the preparation of certain technically valuable oxazolines and is more particularly concerned with the production of oxazolines conforming to the conventional formula:

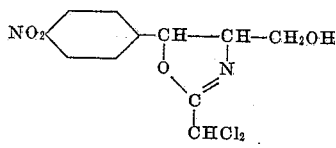

These compounds as well as the starting materials from which they may be prepared contain two asymmetric carbon atoms and can exist in structural as well as optical isomeric forms. By analogy with the nomenclature adopted by Rebstock et al. (J. A. C. S., vol. 71, pp. 2458–2473) in connection with the diastereoisomeric amido-diol, 2-dichloracetamido-1-p-nitrophenylpropane 1:3-diol, an optically active isomer of which is known by the common name "chloramphenicol," the structural isomeric forms are herein referred to as "erythro" and "threo" respectively. Both the erythro and the threo forms can exist as racemates of optically active isomers giving a total of six different forms. The foregoing structural formula of conventional type includes, therefore, the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atom. The D-threo oxazoline isomer has the same configuration with respect to the alpha carbon atom as the therapeutically active isomer of chloramphenicol which has been designated D(—)-threo 2-dichloracetamido-1-p-nitrophenylpropane 1:3-diol.

It is the object of the present invention to provide a new and commercially useful process for the preparation of the threo forms of 2-dichloromethyl-5-p-nitrophenyl-4-hydroxymethyl-$\Delta^2$-oxazoline having the aforesaid conventional formula.

According to the present invention, threo 2-dichloromethyl - 5-p-nitrophenyl-4-hydroxymethyl-$\Delta^2$-oxazolines, racemate and optical isomeric forms, are prepared by the cyclisation of the hydroxy acid esters of the threo alcohols, 2-dichloracetamido-1-p-nitrophenyl-1-chloro-3-hydroxy-propanes, of the formula:

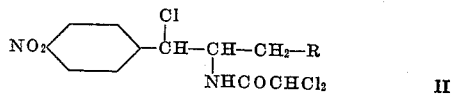

where R represents a readily hydrolysable hydroxy acid ester group (of which various examples are given in the specification of co-pending application Ser. No. 212,489) by treatment with a dilute aqueous solution of an alkali metal hydroxide, such as sodium or potassium hydroxide. Cyclisation is accompanied by simultaneous hydrolysis of the ester group in the 3-position.

Preferably, the reaction is effected by dissolving the propanol in a water-miscible inert organic solvent such as ethanol, adding to the solution a dilute aqueous solution of an alkali metal hydroxide, conveniently an aqueous solution of sodium or potassium hydroxide having a normality of about 1 to about 3, and allowing the reaction mixture to stand (with or without stirring) at about room temperature or less until the reaction is completed, when the desired product can be separated by conventional methods.

The starting material of Formula II is conveniently prepared by esterifying erythro 2-dichloracetamido-1-p-nitrophenylpropane 1:3-diols (see the specification of co-pending application Ser. No. 212,489) under conditions such that the hydroxyl group in the 1-position is unattacked, e. g. by treatment with carboxylic acid chlorides or anhydrides or, in certain cases, of chloro carbonic esters, in the presence of a tertiary base, and treating the resultant erythro esters with thionyl chloride (see the specification of co-pending application Ser. No. 212,489). The substitution of chlorine for hydroxyl involves epimerisation to the threo form.

In one preferred embodiment of this invention, the aforesaid threo compound of Formula II is employed in the DL or D form, the resultant oxazoline having the DL or D form, respectively. This involves the use in the aforesaid process of producing the compounds of Formula II of the DL- or L-erythro propanol esters respectively. The resultant oxazolines are valuable intermediates for the production of chloramphenicol and the DL-mixture of which it is the D-component and are also of direct therapeutic interest in that they possess antibiotic activity. The oxazolines prepared according to the present invention can be treated with dilute hydrochloric acid at low temperatures followed by concentrated aqueous ammonia to give 2-dichloracetamido-1-p-nitrophenylpropane-1,3-diols as described and claimed in the copending application of Ronald Slack Serial No. 199,937, filed December 8, 1950.

The following non-limitative examples show how the invention may be put into practice.

Example I 1.15 g. of DL-threo 2-dichloracetamido-1-p-nitrophenyl-1-chloro-3-acetoxy-propane of M. P. 119–120° C. are dissolved in 25 cc. of ethanol. After cooling to +5° C., 6.3 cc. of normal caustic soda solution are slowly added. After stirring for two hours in the cold, the excess of caustic soda is neutralised with dilute sulphuric acid. The mixture is then poured into 100 cc. of water; a product is precipitated which is filtered off, washed with water and dried in vacuo. There is thus obtained 0.66 g. of DL-threo 2-dichloromethyl-4-hydroxymethyl-5-p-nitrophenyl-$\Delta^2$-oxazoline, M. P. 127–128° C.

Example II 0.85 g. of the acid succinate of DL-threo 2-dichloracetamido-1-p-nitrophenyl-1-chloropropane 3-ol of M. P. 150° C. are dissolved in 3 cc. of ethanol. 2.75 cc. of 2.1 N caustic soda solution are added drop by drop to this solution at room temperature with agitation. There soon crystallises from the mixture a product which is filtered off, washed with water and dried in vacuo. There is thus obtained 0.2 g. of the oxazoline of Example I of M. P. 128–129° C.

Example III 1.0 g. of DL-threo 2-dichloracetamido-1-p-nitrophenyl-1-chloro-3-carbethoxyoxy-propane of M. P. 116–117° C. are dissolved in 15 cc. of ethanol; 3.65 cc. of 2 N caustic soda are added. After stirring for 2 hours at +5° C. the mixture is poured into 50 cc. of water. A product crystallises which is filtered off, washed with water and dried in a vacuum desiccator. There is thus obtained 0.47 g. of an oxazoline identical with that of Example I.

Example IV

To a solution of 10.2 g. of D-threo 2-dichloracetamido-1-p-nitrophenyl-1-chloro-3-acetoxy-propane (M. P. 101–102° C., $(\alpha)_D^{20} = -8°$ (c.=6.4% in ethyl acetate)) cooled to 0° C. are added drop by drop 10 cc. of 1.85 N caustic soda, then a further 20 cc. are added rapidly and the mixture is stirred for 2 hours at 0° C. The excess caustic soda is neutralised to phenolphthalein with dilute sulphuric acid, and the solution obtained poured into 450 cc. of water. A product crystallises which is filtered off, washed with water and dried in vacuo. There are thus obtained 5.2 g. of D-threo 2-dichloromethyl-4-hydroxymethyl-5-p-nitrophenyl-Δ²-oxazoline of M. P. 123–126° C. After purification by recrystallisation in benzene, the product has the following characteristics: M. P.=134° C., $(\alpha)_D^{20}=-13.5°$ (c.=6.5% in ethyl acetate).

We claim:

1. Process for the preparation of an oxazoline of formula,

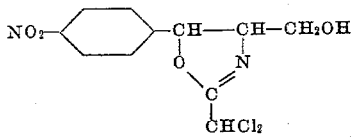

which comprises reacting a 1-chloropropane compound of formula,

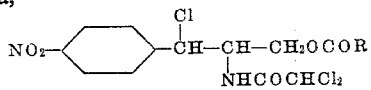

with a dilute aqueous solution of an alkali metal hydroxide at a temperature not substantially above room temperature, where R is a member of the class consisting of lower alkyl, carboxy-substituted lower alkyl, lower alkoxy and phenyl.

2. Process according to claim 1 wherein the 1-chloropropane compound is in the DL-threo form and the oxazoline produced is likewise in the DL-threo form.

3. Process according to claim 1 wherein the 1-chloropropane compound is in the D-threo form and the oxazoline produced is likewise in the D-threo form.

4. Process for the preparation of a threo 2-dichloromethyl-4-hydroxymethyl-5-p-nitrophenyl - Δ² - oxazoline which comprises reacting a carboxy-substituted lower alkyl ester of a threo 2-dichloracetamido-1-p-nitrophenyl-1-chloropropane-3-ol with a dilute aqueous solution of an alkali metal hydroxide at a temperature not substantially above room temperature.

5. Process according to claim 4 where the 1-chloropropane compound is the acid succinate of DL-threo 2-dichloracetamido-1-p-nitrophenyl-1-chloropropane - 3-ol and the oxazoline produced is in the DL-threo form.

6. Process for the preparation of a threo 2-dichloromethyl-4-hydroxymethyl-5-p-nitrophenyl - Δ² - oxazoline which comprises reacting a lower alkyl ester of a threo 2-dichloracetamido-1-p-nitrophenyl-1-chloropropane - 3-ol with a dilute aqueous solution of an alkali metal hydroxide at a temperature not substantially above room temperature.

7. Process according to claim 6 where the 1-chloropropane compound is D-threo 2-dichloracetamido-1-p-nitrophenyl-1-chloro-3-acetoxypropane and the oxazoline produced is in the D-threo form.

8. Process for the preparation of a threo 2-dichloromethyl-4-hydroxymethyl-5-p-nitrophenyl - Δ² - oxazoline which comprises reacting a lower alkoxy ester of a threo 2-dichloracetamido-1-p-nitrophenyl-1-chloropropane - 3 - ol with a dilute aqueous solution of an alkali metal hydroxide at a temperature not substantially above room temperature.

9. Process according to claim 8 where the 1-chloropropane compound is DL-threo 2-dichloracetamido-1-p-nitrophenyl-1-chloro-3-carbethoxyoxypropane and the oxazoline produced is in the DL-threo form.

References Cited in the file of this patent

UNITED STATES PATENTS

| Number | Name | Date |
| --- | --- | --- |
| 2,114,326 | Adams et al. | Apr. 19, 1938 |
| 2,513,346 | Moersch et al. | July 4, 1950 |

OTHER REFERENCES

Wiley et al.: "Chemical Reviews," vol. 44, June 1949, pp. 449–51.